(12) United States Patent
Lester et al.

(10) Patent No.: US 9,219,715 B2
(45) Date of Patent: *Dec. 22, 2015

(54) MEDIATOR UTILIZING ELECTRONIC CONTENT TO ENFORCE POLICIES TO A RESOURCE

(71) Applicant: AlephCloud Systems, Inc., Sunnyvale, CA (US)

(72) Inventors: James Lewis Lester, Dublin, CA (US); Roy Peter D'Souza, Belleview, WA (US)

(73) Assignee: PivotCloud, Inc., Sunnyvale, CA (US)

( * ) Notice: Subject to any disclaimer, the term of this patent is extended or adjusted under 35 U.S.C. 154(b) by 132 days.

This patent is subject to a terminal disclaimer.

(21) Appl. No.: 14/226,870

(22) Filed: Mar. 27, 2014

(65) Prior Publication Data

US 2014/0208108 A1     Jul. 24, 2014

Related U.S. Application Data

(63) Continuation-in-part of application No. 14/171,682, filed on Feb. 3, 2014, now Pat. No. 8,976,967, which is a continuation of application No. 13/716,351, filed on Dec. 17, 2012, now Pat. No. 8,681,992, which is a (Continued)

(51) Int. Cl.
*H04L 9/00* (2006.01)
*H04L 9/32* (2006.01)

(Continued)

(52) U.S. Cl.
CPC .......... *H04L 63/0428* (2013.01); *H04L 9/0825* (2013.01); *H04L 9/0833* (2013.01); *H04L 9/14* (2013.01); *H04L 2209/60* (2013.01)

(58) Field of Classification Search
CPC .............. H04L 9/08; H04L 9/14; H04L 9/30; H04L 9/0802; H04L 9/0805; H04L 9/0816; H04L 9/0825; H04L 9/0833; H04L 9/0861; H04L 9/3006; H04L 9/0819; H04L 63/0428; H04L 63/065; H04L 9/32; H04L 9/3202
USPC .............. 380/277–279, 283, 44, 45; 713/189, 713/193

See application file for complete search history.

(56) References Cited

U.S. PATENT DOCUMENTS

| | | | |
|---|---|---|---|
| 6,260,142 B1 * | 7/2001 | Thakkar | ................. H04L 9/0822 380/279 |
| 6,986,044 B1 * | 1/2006 | Inada | .................... H04L 9/0822 380/282 |

(Continued)

OTHER PUBLICATIONS

Van Dijk, Juels: On the Impossiblity of Cryptoraphy Alone for Privacy-Preserving Cloud Computation. Usenix Hotsec10 2010.

(Continued)

*Primary Examiner* — Hosuk Song
(74) *Attorney, Agent, or Firm* — Brian R. Short

(57) ABSTRACT

Methods, systems and apparatuses for a mediator enforcing policies to a resource utilizing an electronic content, are disclosed. One method includes receiving, by a mediator computing device of a mediator, a second share $SK_{G2}$ from an owner server, wherein a first share $SK_{G1}$ is provided to a member server of a member of a group by the owner server, wherein the owner defines policies associated with the group. The method further includes the mediator receiving a request from the member for mediation, including the mediator receiving a dispatch of the header of the encrypted electronic content, determining, by the mediator, whether the member is eligible to access the electronic content based at least in part on the policies associated with the group, if eligible, the mediator responds to the request for mediation with a member accessible header.

30 Claims, 12 Drawing Sheets

Related U.S. Application Data continuation-in-part of application No. 13/613,080, filed on Sep. 13, 2012, now abandoned.

(60) Provisional application No. 61/598,071, filed on Feb. 13, 2012.

(51) Int. Cl.
*H04L 29/06* (2006.01)
*H04L 9/08* (2006.01)
*H04L 9/14* (2006.01)

(56) References Cited

U.S. PATENT DOCUMENTS

| | | | | |
|---|---|---|---|---|
| 7,249,382 | B2 * | 7/2007 | Kawell, Jr. | G06F 21/10 380/284 |
| 7,711,647 | B2 | 5/2010 | Gunaseelan et al. | |
| 8,156,337 | B2 * | 4/2012 | Balfanz | H04L 63/0492 713/168 |
| 8,359,473 | B1 | 1/2013 | Sorotokin et al. | |
| 8,681,992 | B2 * | 3/2014 | D'Souza | H04L 9/0825 380/277 |
| 8,976,967 | B2 * | 3/2015 | D'Souza | H04L 9/0825 380/277 |
| 2010/0169656 | A1 | 7/2010 | Yoshida et al. | |
| 2011/0119481 | A1 | 5/2011 | Auradkar et al. | |
| 2011/0145580 | A1 | 6/2011 | Auradkar et al. | |
| 2011/0145593 | A1 | 6/2011 | Auradkar et al. | |
| 2012/0096389 | A1 | 4/2012 | Flam et al. | |
| 2012/0221421 | A1 | 8/2012 | Hammad | |
| 2012/0278388 | A1 | 11/2012 | Chiu | |
| 2012/0321086 | A1 | 12/2012 | D'souza et al. | |
| 2012/0323750 | A1 | 12/2012 | Sivaramakrishnan et al. | |
| 2012/0324237 | A1 | 12/2012 | D'souza et al. | |
| 2013/0124853 | A1 | 5/2013 | Sorotokin et al. | |

OTHER PUBLICATIONS

D'Souza, Jao, Mironov, Pandey: Publicly Verifiable Secret Sharing for Cloud-Based Key Management. Indocrypt 2011.

Boneh, Segev, Waters: Targeted malleability: homomorphic encryption for restricted computations. ACM 2012.

Dara: Cryptography Challenged for Computation in Public Clouds. IACR Eprint 2013.

Chen: CloudHKA: A Cryptographic Approach for Heirarchical Access Control in Cloud Computing. ANCS'13 2013.

* cited by examiner

Creating, by an owner server, a group comprising generating a group public key $PK_G$ and a group secret key $SK_G$, and the owner defining policies associated with the group.
810

Adding, by the owner server, a member to the group, comprising generating a first share $SK_{G1}$ from the group secret key $SK_G$ and a public key of a member, and a second share $SK_{G2}$ from a public key of a mediator and the group secret key $SK_G$
820

Providing, by the owner server, the first share $SK_{G1}$ to a member server of the member and the second shares $SK_{G2}$ to a mediator server of the mediator.
830

Figure 8

A user publishing an electronic content for the group, comprising the user encrypting the electronic content to the group public key $PK_G$, wherein the electronic content includes a header and a payload
840

↓

Obtaining, by the member, the encrypted electronic content
850

↓

Requesting, by the member, mediation by the mediator, comprising the member dispatching the header of the encrypted electronic content to the mediator
860

↓

Determining, by the mediator, whether the member is eligible to access the electronic content based at least in part on the policies associated with the group, if eligible, the mediator responding to the request for mediation with a member accessible header, wherein the member accessible header includes the header after application of $SK_{G2}$.
870

↓

Obtaining, by the member, a secret based on $SK_{G1}$ and the member accessible header
880

↓

Decrypting, by the member, the payload of the electronic content using the secret

MEDIATOR UTILIZING ELECTRONIC CONTENT TO ENFORCE POLICIES TO A RESOURCE

RELATED APPLICATIONS

This application is a continuation-in-part (CIP) of U.S. patent application Ser. No. 14/171,682, filed Feb. 3, 2014, and entitled "Mediator Monitoring and Controlling Access to Electronic Content" which is a continuation of U.S. patent application Ser. No. 13/716,351, filed Dec. 17, 2012, and entitled "Monitoring and Controlling Access to Electronic Content", which is a continuation-in-part (CIP) of U.S. patent application Ser. No. 13/613,080, filed Sep. 13, 2012, and entitled "Providing Trustworthy Workflow Across Trust Boundaries" which claims priority to U.S. Provisional Patent Application No. 61/598,071, filed Feb. 13, 2012, and entitled "High-Scale and Distributed Business and Consumer Networks," all of which are incorporated herein by reference.

FIELD OF THE DESCRIBED EMBODIMENTS

The described embodiments relate generally to electronic communication through cloud networks. More particularly, the described embodiments relate to methods, systems and apparatuses for a mediator utilizing electronic content to enforce policies to a resource.

BACKGROUND

A trust boundary in an electronic network is defined as a region within which all computer systems, their operations, and the data are trusted. Typically, a trust boundary is protected by computer security hardware and software such as firewalls, Virtual Private Networks (VPNs), intrusion detection and prevention systems, data leakage protections, anti-virus programs, etc. For example, for an organization, a trust boundary may include an entire data center infrastructure, including computers connected via VPNs. For an individual, a laptop computer could be her trust boundary.

Various mechanisms exist today to facilitate secure communications between trust boundaries. SSL/TLS and IPSec are two examples. These mechanisms are intrinsically point-to-point, thus for many-to-many secure information sharing and collaboration, it will require a worst case "N-squared messy cross-bar" connectivity for all N trust boundaries where every party needs to be able to field electronic communications from every other party. This can become costly and complex.

On the other hand, Web based technologies, and now cloud computing make information sharing and collaboration increasingly cheaper and easier. In essence, this is a central intermediary based hub-spoke communication model. When it comes to secure sharing, this model requires that the central intermediary to be a trusted escrow that must be trusted by all parties across all trust boundaries in the network and that no one in the network will surreptitiously game the system for their own profit.

Such a blind trust hub-spoke model tends to fail due to a range of challenges that include breaches of hub's electronic perimeters, insider attacks, coercion from governments and organized crime, and other threats to the hub. All indications are that any model that involves conventional electronic security, and is based on a need to trust any central individual or organization to follow the rules, is deeply flawed. This is demonstrated by the fact that even with improvements in technologies for monitoring and protection, the rate of successful intrusions and internal malfeasance is actually rising rapidly.

In present day enterprises, the custodian (typically the hub, the infrastructure service operator/provider in physical possession of the sensitive data) and the curator (typically some spoke, the IT organization that owes and authorizes access to this data) are within the same organization, and most likely within the same legal and compliance domain. Authentication is typically implemented through techniques such as Kerberos and Open ID; authorization is typically through infrastructure such as AD and Security Groups; access control is enforced by the various data containers that include databases, electronic content management systems, and networked file systems. Organizations also leverage PKI and X.509v3 for identity through Smart Cards, SAML/WS-Trust/WS-Federation for single sign-on and federation of authorization. Various technologies and solutions exist for the organization to implement its own Authentication and Authorization, and to federate beyond that organization with business partners and other service providers or service consumers.

When IT infrastructures such as data storage or containers are moved to a hosting service in the cloud, the role of the custodian and curator is separated, where the cloud service provider that is hosting the data is now the custodian of that data, while the curatorship continues to remain in the hands of functionaries within that organization. For legal, compliance and other business IP protection reasons, organizations can't afford the blind trust on the cloud service providers, thus are disinclined to adopt these services, or they demand unlimited liability protection.

In order to solve this problem, the cloud needs to be constrained in function to be only a policy enforcement service that is implementing the exact policy specified by the customer organization and its curator functionary. Furthermore, this new cloud architecture needs to seamlessly integrate, without any significant requirement to modify the existing IT infrastructure, or the existing business process.

Typically for an individual, business or other organization that is regulated, it is an option for them to outsource their IT, but it is not an option for them to outsource their risk. In the case of negligence or maleficence on the part of a service provider (hub), the risks to the individual or organization could be significant. As a consequence, organizations and businesses require significant liability protection from the service provider. This would transfer the risk to the hub, which could exacerbate that organization's own risk since it could be subject to negligence or maleficence on the part of their own employees, or coercion from governments, or intrusions by hackers.

In short, there is no solution existing today that can allow organizations and individuals (curators) to extend the existing IT infrastructures along with the business processes (such as Governance, Risk Management, and Compliance, GRC in short) to the cloud service providers (custodians), across the trust boundaries while a) the data privacy and confidentiality are ensured—custodians can never see the sensitive data nor the policies about how the data can be accessed; b) the visibility into, and the control over access to, or modification of the data are fully retained by the curators; and c) multiple curators across trust boundaries can collaborate and share the sensitive data through the custodians.

There is a need for systems, methods and apparatuses that address the above-listed requirements in cloud computing, and provide a trustworthy workflow across trust boundaries between parties.

A trustworthy workflow is defined as a cryptography-based mechanism that enables all parties to securely communicate across trust boundaries through the central intermediary (the hub), without the hub ever being able to access the data, nor the data access policies. All end-points in such a workflow can count on the same degree of trustworthiness of a point-to-point secure communications supported by protocols such as SSL/TSL and IPSec, as described before.

In addition, for a geo-distributed solution, there are technical, geo-political or legal reasons why a single trustworthy hub would not be sufficient. The technical reasons might include performance; the geo-political reasons might include governments that desire to suppress collaboration or commerce for sovereign reasons; the legal reasons might include the inefficiency of settlement, reconciliation, litigation and arbitration across distinct legal boundaries. For that reason, it is necessary to have a federation of trustworthy hubs in disparate regions that can collaborate to provide the same trustworthiness, but with a greater degree of resilience, lower latencies and higher scale.

It is desirable to have methods, systems and apparatuses for a mediator utilizing electronic content to enforce policies to a resource.

SUMMARY

An embodiment includes a method of a mediator enforcing policies to a resource utilizing an electronic content. The method includes receiving, by a mediator computing device of a mediator, a second share $SK_{G2}$ from an owner server, wherein a first share $SK_{G1}$ is provided to a member server of a member of a group by the owner server, wherein the group is created by the owner server generating a group public key $PK_G$ and a group secret key $SK_G$, and wherein the owner defines policies associated with the group, wherein the member is added by the owner server to the group by generating the first share $SK_{G1}$ from the group secret key $SK_G$ and a public key of the member, and the second share $SK_{G2}$ from the group secret key $SK_G$ and a public key of the mediator, wherein a user publishes an electronic content for the group, comprising the user encrypting the electronic content to the group public key $PK_G$, wherein the electronic content includes a header and a payload, and wherein the member obtains the encrypted electronic content. The method further includes the mediator receiving a request from the member for mediation, including the mediator receiving a dispatch of the header of the encrypted electronic content, determining, by the mediator, whether the member is eligible to access the electronic content based at least in part on the policies associated with the group, if eligible, the mediator responding to the request for mediation with a member accessible header, wherein the member accessible header includes the header after application of $SK_{G2}$, wherein the member obtains a secret based on $SK_{G1}$ and the member accessible header, and wherein the member decrypts the payload of the electronic content using the secret.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 8 is a flow chart that includes steps of a method of a mediator enforcing policies to a resource utilizing an electronic content, according to an embodiment.

FIG. 9 is a flow chart that includes additional steps of a method of a mediator enforcing policies to a resource utilizing an electronic content, according to an embodiment.

DETAILED DESCRIPTION

Figure 1:
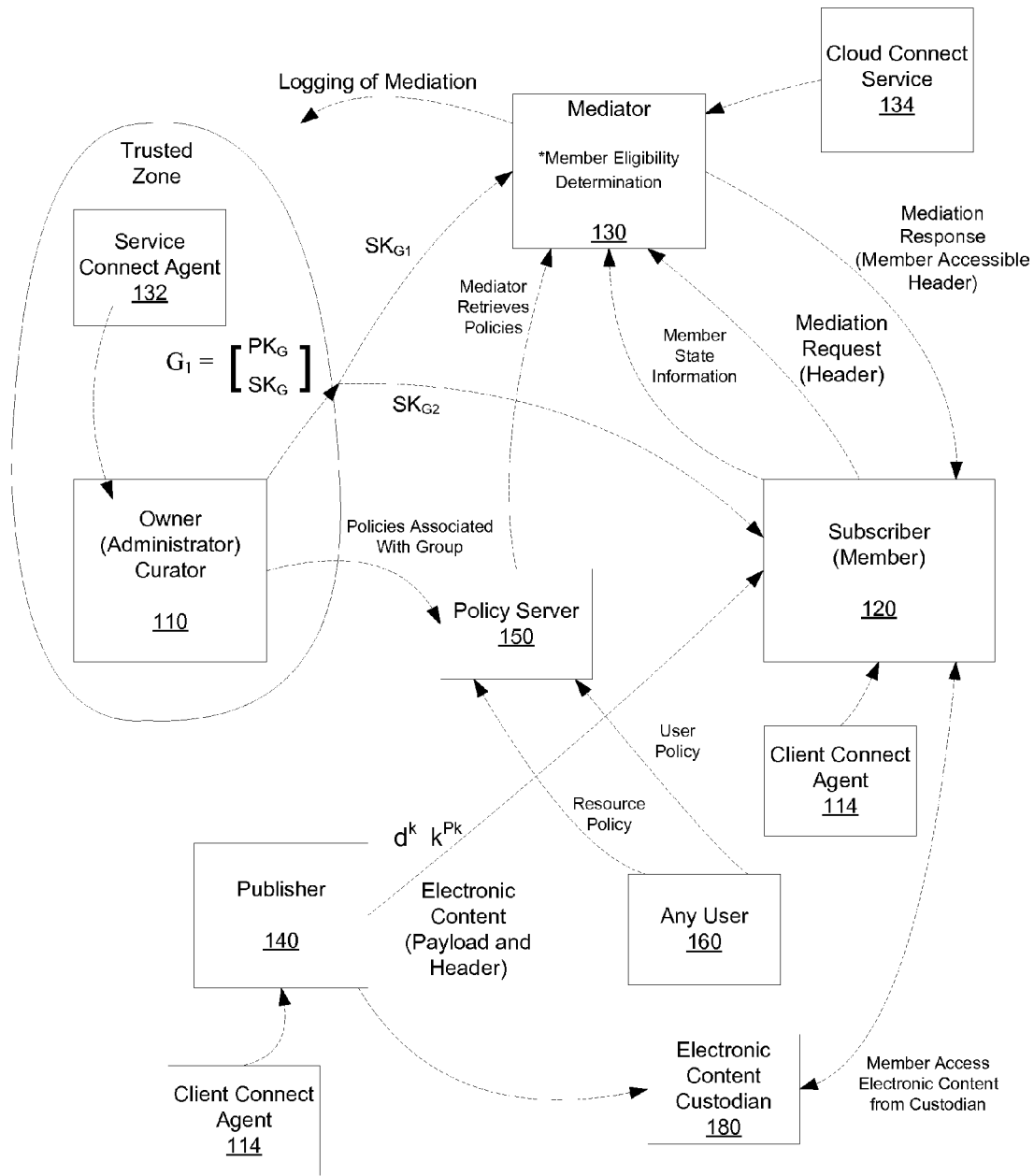
FIG. 1 shows a system that provides enforcement of policies to a resource utilizing an electronic content, according to an embodiment.

The described embodiments include methods, systems and apparatuses for one or more mediator utilizing electronic content to enforce policies to a resource.

Utilizing at least some of the described embodiments for mediation, organizations can use $3^{rd}$ party hosted commercial cloud storage providers to store documents produced by or for their employees while maintaining confidentially and integrity of that content. However organizations may also want to have fine grain control over access and use of those documents. Organizations expect to be able to set policies on the use of documents that cover, for example, when a document can be accessed, if and how much a document can be printed, and if and how much a document can be copied for use in other or external documents. That is, for at least some embodiments, the set policies includes control of at least three levels of permission, including, for example, opening, copying and printing the electronic content or document.

For at least some embodiments, the permissions include a time, an amount, and/or location restrictions on the permissions. Presently, there are existing solutions that allow organization to set some policies (such as, Microsoft® RMS, Adobe® LiveCycle Rights Management, Documentum, etc.), however these solutions require access to the content or keys in such a way that breaks the confidentially that the organization enjoys by using mediation. For some embodiments this is solved by allowing the mediator access to the set of policies that it can apply to enforce the initial access requirement while maintaining confidentially and having a trusted agent on the employees' computer enforcing adherence to a mediator provided policy for the documents.

At least some of the described embodiments provide mediator control of access during rental of a physical asset. There are a number of new online marketplaces that rent access to physical items such as cars or bedrooms. Currently the restrictions on the use of the items are based upon the contract terms, and there is no mechanism for real time enforcement or notification. Consider for instance a car-sharing marketplace where an owner allows his car to be used by others while he is at work. This owner might want to place restrictions that limit usage by time (must end before the commute home), location (must not leave the city), or class of driver (must have valid license, good insurance, or other certification). Currently the owner can express those restrictions in the marketplace listing, but has no mechanism for enforcement of this except after the fact.

In some of the current cases access to the car is controlled by an electronic lock box, which will only open for authorized users. In some embodiments, this lock box can be accessed through mediation, which stills restrict access to a group of authorized users while maintaining anonymity. In other embodiments, the owner can create policies, which further restrict access based upon other attributes of the driver. For instance if there were a third party that would attest to a driver being safe and insured, such as AAA, and would revoke that attestation if that driver no longer failed to meet the appropriate criteria, then the owner could specify that such an attestation must be present.

In still other embodiments, access can be restricted further by additionally having the controller for the electronic lock box hooked into the car's Engine Control Unit. This allows the electronic lock box after receiving a policy from the Mediator, to enforce that policy, such as a enforce restriction on time or location of usage, by either shutting off, or by switching to lower power mode.

For at least some embodiments, the policies include a determination of which authorities are trusted to issue attestation for particular facts. For at least some embodiments, attestation includes the statement of fact from an issuing authority, where the issuing authority is trusted for issuing that statement of fact for a particular user.

At least one benefit of the described embodiments includes the ability for individuals and organizations to leverage the benefits of clouds and other networks, which include lower costs, higher scale, and geo-distribution, in order to maximize their own efficiencies that might include lower capital and operational expenses.

There exist several collaboration and commerce networks that can benefit from the lower costs, scale and geo-distribution of clouds. These networks include supply and demand chains, and international trade. In the present day there is a precise support system that includes banks, escrow parties, shipping corporations, and mediation. However these do not scale for electronic commerce, when it is necessary for a human to be a mandatory intermediary for any typical transaction (as opposed to a human needing to get involved in the case of an error or a conflict).

Due to the replacement of that the previously described "messy crossbar" with a trustworthy hub, it is now easier for diverse technologies and solutions to integrate and inter-operate, since each spoke needs to perform a one-time integration with the trustworthy hub. In addition, it is possible for the hub to present a variety of interfaces to the spokes, and then perform the routing and inter-operation within the hub. In deployment scenarios with multiple hubs, each hub might implement a specific class of technologies.

Whereas present-day distributed architectures are stilted due to the need to protect data through the containers that they reside in, the enablement of visibility and control facilitates the caching of electronic content closer to the expected consumer, which optimizes the data path, whereas the control path for key access and for metering is easier to optimize for cloud scale. This provides the underpinning for new architectures that enable higher-scale and greater efficiency, noting that the current corporate and Internet traffic is dominated by video and file sharing.

FIG. 1 shows a system that provides enforcement of policies to a resource utilizing an electronic content, according to an embodiment. As shown, the system includes an owner 110, a member 120, and a mediator 130. An embodiment includes the formation of a group, wherein the group allows for the sharing and collaboration of an electronic content, wherein the electronic content is utilized for providing enforcement of policies of the resource. The group is formed by the owner 110. For an embodiment, formation of the group includes the owner 110 publishing a group public key $PK_G$, generating and maintaining a group secret key $SK_G$ as a secret, and the owner defining policies associated with the group. The owner 110 can store the group secret key $SK_G$, for example, in its own data center. The owner 110 can store the policies associated with the group in a policy server 150.

Further, the member 120 and the mediator 130 each publish their own public keys, and maintain corresponding secret keys as a secret. The member 120 and the mediator 130 can each secure their secret key by protecting the secret key through encryption before storing or transmitting the secret key to a custodian. That key encryption key can be derived from a pass phrase that only the principal (originator of the secret key) knows.

Once the group has been formed, the owner 110 adds members (such as member 120) by generating a first share $SK_{G1}$ from the group secret key $SK_G$ and a public key of a member, and a second share $SK_{G2}$ from the group secret key $SK_G$ and a public key of a mediator. The owner 110 adds the member to the group by obtaining the member's public key from the mediator (or some other public source).

Once the group has been formed and the owner 110 has published the group public key $PK_G$, a publisher 140 can encrypt an electronic content using the group public key $PK_G$. For an embodiment, the user retrieves the group public key $PK_G$ from a custodian (owner 110), wherein the custodian is operating in the directory role. For an embodiment, the electronic content is encrypted according to a key K, and the key K is encrypted according to the group public key $PK_G$. For an embodiment, the electronic content includes a payload and a header.

The member 120 can obtain the encrypted electronic content in various ways. The publisher 140 may send the encrypted electronic content to the member 120, the member 120 may retrieve the encrypted electronic content, or there may be an intermediary, such as, Drop Box® between the publisher 140 and the member 120.

The member 120 receives the electronic content, but cannot directly decrypt the electronic content because the member 120 does not have access to the group secret key $SK_G$. However, at least some embodiments allow the member 120 to decrypt the electronic content through the aid of the mediator 130. More specifically, for an embodiment, the member 120 request mediation by the mediator 130 by submitting the header of the electronic content to the mediator 130. If the electronic content is small, the header may actually be the payload of the electronic content. More typically, the payload is large, and the header only includes a cryptographic secret that can be used to unlock the payload.

For at least some embodiments, the mediator determines which policy applies to the resource through the header, and by accessing policy information.

For an another embodiment, a user server publishes the actual payload to a location that is resilient against inappropriate access or modification, or because the payload is too voluminous for transmission in the data path, and publishing a capability for gaining access in lieu of the payload, and the member server consequently requiring mediation in order to access that capability for gaining access to the payload.

In certain situations where there is a pre-defined data path, such as electronic content sharing through a solution such as Dropbox®, the encrypted electronic content, and the associated metadata is best packaged as a single unit that travels together. The original electronic content that is encrypted is termed the 'payload', and the header contains the cryptographic material and any associated electronic content classifications and/or access policies.

In other situations where the digital content is too unwieldy to share through a solution such as Dropbox®, either due to the size, or to the streaming nature of access, it may be better to replace the payload with an address. In this situation, the header contains a capability that constitutes both a location that is otherwise difficult to guess, along with the cryptographic material for an authorized party to perform cryptographic operations such as verification and decryption. In this case there might be other benefits, such as tamper prevention, since lack of access to that capability would typically preclude accidental or malicious defacement or deletion, where defacement renders that original content inaccessible.

In other situations the payload itself might be very small, perhaps representing an offer or a bid in a marketplace scenario, or some other secret that needs to be securely stored or shared. In this case it might be optimal to embed this secret directly within the header. After a successful mediation operation, the secret becomes directly accessible to the authorized recipient (such as, member 120) without the subsequent need to unlock any payload.

Once the mediator 130 receives the request for mediation from the member 120, the mediator 130 checks to confirm that the member 120 is eligible for access to the electronic content based at least in part on the policies associated with the group. The eligibility of the member 120 can be determined in one or more ways.

One mechanism for determining member eligibility is for the mediator 130 to maintain a white list, or a black list of eligible members. Typically the owner 110, or the delegate or auditor updates this list. In this case the member 120 is eligible if they are on the white list, or if they are not on the black list, or both.

Another mechanism for determining member eligibility is for the mediator 130 to maintain a matrix of authorization, where one dimension of the matrix is the electronic content classification, while the other dimension is the access requirements. The first might be transferred securely (and privately in some cases) from the publisher 140, to the mediator 130 through the header. The second might specify individuals (through a white or black list), or it might specify specific roles that a requestor needs to be member of, which is sometimes described as RBAC, or Role Based Access Control. The second might also specify a claim that the member 120 needs to provide to prove they have legitimate access to that electronic content. This might be either an ancillary mechanism that is used in addition to group membership usually signs this claim, or it might be in lieu of group membership (where any member with the right claim will have access to that electronic content). Some authority that the Mediator knows of can issue such a claim.

There are other mechanisms for the mediator 130 to determine eligibility of a member 120, which involve integration with existing enterprise and federation infrastructures. For example, in a policy-based network, the mediator 130 may serve as an enforcement point (or Policy Enforcement Point) that needs to check with one or more Policy Decision Points before it executes the mediation.

For an embodiment, the mediator 130 logs the requests by the member, eligibility determinations, and mediator responses. For an embodiment, the logging includes the mediator 130 storing the requests by the member, eligibility determinations, and mediator responses. Each of these can be logged at a server, wherein the server is accessible by the owner and others. For an embodiment, the logging includes the mediator dispatching alerts of the requests by the member, eligibility determinations, and mediator responses to the owner and others.

Due to the trustworthy nature of the hub, it is an enabler of fine-grain lifecycle management of electronic content, perhaps in cases where it might be a business record, and this facilitates the enforcement of retention, disposition, hold, and other events of data that is owned by an individual or organization, but is outside their region of control.

Based on the configuration, the hub may either log access requests (either ones that failed due to lack of eligibility, or both). These logs may be made available to just the parties authorized by the group owner, or their delegate or auditor. In other cases the logs may be delivered in the form of alerts to the group owner, or their delegate or auditor, in cases where there is a need for rapid notification.

If the mediator 130 determines that the member 120 is eligible, the mediator 130 responds to the request for mediation with a member accessible header, wherein the member accessible header includes the header after application of $SK_{G2}$.

Typically the logs and alerts from the hub are integrated with enterprise infrastructure that might range from Syslogd, to specialized monitoring and discovery solutions, or possibly to high-scale log processing systems that might post-process these logs for purposes that might include filtering, classification, pattern or anomaly detection. In many cases, a cloud or similar network can provide an end-to-end service that would significantly reduce any individual or organization's capital and operational expenses.

For an embodiment, the member 120 obtains a secret based on $SK_{G1}$ and the member accessible header. Further, the member 120 decrypts the payload of the electronic content using the secret. Through the controlled electronic content (electronic content) access of the described embodiments, the member 120 is able to decrypt the electronic content only through the participation and control of the mediator, and the owner 110.

As previously described, for at least some embodiments, the electronic content provides access to the resource. For at least some embodiments, the resource includes a physical resource, and the electronic content provides access to use of the physical resource. For example, as described above, at least some of the described embodiments provide mediator control of access during rental of a physical asset. There are a number of new online marketplaces that rent access to physical items such as cars or bedrooms. Currently the restrictions on the use of the items are based upon the contract terms, and there is no mechanism for real time enforcement or notification. As previously described, a car owner may allow his car to be used by others while he is at work. This owner might want to place restrictions that limit usage by time (must end before the commute home), location (must not leave the city), or class of driver (must have valid license, good insurance, or other certification). Currently the owner can express those restrictions in the marketplace listing, but has no mechanism for enforcement of this except after the fact.

For at least some embodiments, the resource includes at least one financial instrument, and the electronic content provides access to the financial instrument such as numbered access bank account like a Swiss bank account.

For at least some embodiments, the policies associated with the group control access to the resource. For at least some embodiments, the policies associated with the group control access to the group, such as modifying policies for the group or content shared to the group. For at least some embodiments, the policies associated with the group control access to add resources to the group, such as publishing a piece of electronic content. For at least some embodiments, the policies associated with the group control access to administer the group, such as adding or removing members from the group or adding policies to the group or content shared to the group.

As shown in FIG. 1, for an embodiment, the electronic content is stored at a custodian 180. The member 120 can then access the electronic content from the electronic content from the custodian, such as untrusted $3^{rd}$ party commercial storage providers like Box®, Dropbox®, or Microsoft OneDrive®. These provide enterprises with cost effective means of sharing electronic content both within and outside of the company, but currently are limited because if the electronic content is sensitive to the business, it will be exposed to the custodian, which is not desirable. The described embodiments address the confidentiality problems faced by these custodians, and additionally, allow for the setting of policies the set authorizations on what users can do with the electronic content after having accessed it.

For an embodiment, the mediator determines which policy applies to the resource by accessing policy information. For at least some embodiments, the policy is based at least in part on the policies associated with the group. As previously described, for an embodiment, the policy is accessed from a policy server.

For an embodiment, the determining, by the mediator, whether the member is eligible to access the resource is additionally based at least in part on member state information. As shown in FIG. 1, the member state information is provided to the mediator 130 by the member 120. For an embodiment, the member state information is included as a part of the mediation request received by the mediator 130.

For at least some embodiments, the member state information includes assigned location information. For at least some embodiments, the assigned location information is received from a radio receiver of the user. For instance, for an embodiment, access to a resource is limited to use in a particular geographic location, and/or the geographic location is used in other policies such as restricting access time.

For at least some embodiments, the member state information includes attestations of eligibility to access properties of the resource. For at least some embodiments, attestation includes the statement of fact from an issuing authority, where the issuing authority is trusted for issuing that statement of fact for a particular user.

For at least some embodiments, the member determines whether the member has access to the resource or properties of the resource based on the member state information. For at least some embodiments, the member server runs a trusted agent, and wherein the trusted agent verifies that the member has access to the resource or properties of the resource based on the member state information.

As shown in FIG. 1, for at least some embodiments, resource policies are set or applied by any user 160. Note that the owner 110 and/or the member 120 can be included with the any user 160. For an embodiment, the determining, by the mediator, whether the member is eligible to access the resource is additionally based at least in part on the resource policies.

For at least some embodiments, the users that are allowed to set policies in a group, is limited to the owner of the group, and any designees. Similarly, for an embodiment, the users that are able to set policies on a document is limited to the users that published the document, and any designees. However, at least some embodiment support enterprises generally applying their own business rules for which users can set policies.

As shown in FIG. 1, for at least some embodiments, user policies are set or applied by any user. Further, for at least some embodiments, determining, by the mediator, whether the member is eligible to access the resource is additionally based at least in part on the user policies.

As shown, the mediator 130 is at least partially controlled by a cloud connect service (CCS) 134, the member 120 and the publisher 140 are at least partially controlled by a client connect agent (CCA) 114, and the owner 110 is at least partially controlled by a service connect agent (SCA) 132. The owner 110 operates within a trusted zone and the mediator operates within a partially trusted zone.

In some embodiments the CCS 134 centralizes roles that include Directory, Key Store, Mediator, Log Storage and Delivery, and others. In other embodiments a separate party that includes the owner operator or their organization or delegate hosts the Mediator.

It is to be understood that the roles of each of the parties (owner 110, member 120, mediator 130, publisher 140) can be changed, and/or the parties can play multiple roles. That is, for example, the member 120 can additionally play the role of owner. In some embodiments the group owner 110 represents more than one individual, whereby access to the group secret key itself is mediated in a similar operation.

FIG. 1 provides trustworthy workflow between a publisher 140 and a member 120 of a group formed by an owner 110. For an embodiment, the owner 110 includes a custodian. For an embodiment, the mediator 130 includes a curator. Each of the owner 110, the member 120, the mediator 130 and the publisher 140 include servers, wherein each server includes at least one or more processors and memory.

Figure 2:
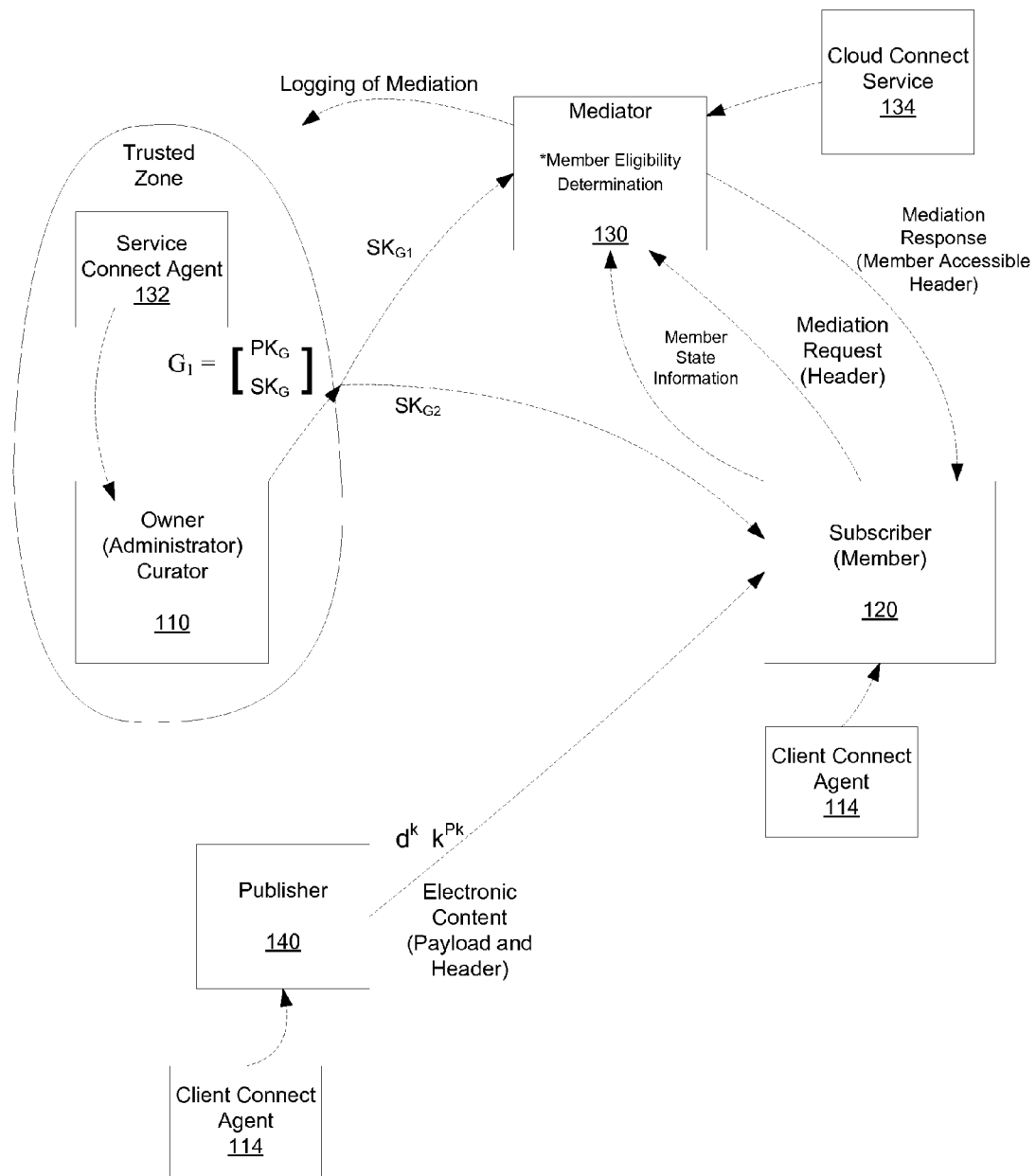
FIG. 2 shows another system that provides enforcement of policies to a resource utilizing an electronic content, according to an embodiment.

FIG. 2 shows another system that provides enforcement of policies to a resource utilizing an electronic content, according to an embodiment. This embodiment does not include the policy server 150 of FIG. 1. For this embodiment, the mediator receives the policies associated with the group through the header of the mediation request. That is, for an embodiment, the mediator determines which policy applies to the resource through the header, and by accessing policy information. For an embodiment, the policies associated with the group are set by the owner.

For an embodiment, the mediator requests and retrieves the policies associated with the group from the owner.

For an embodiment, the mediator retrieves the policies associated from the group from the policy server 150 (of FIG. 1), and/or retrieves the policies associated from the group from the owner, and/or obtains the policies associated from the group through the header of the mediation request.

Figure 3:
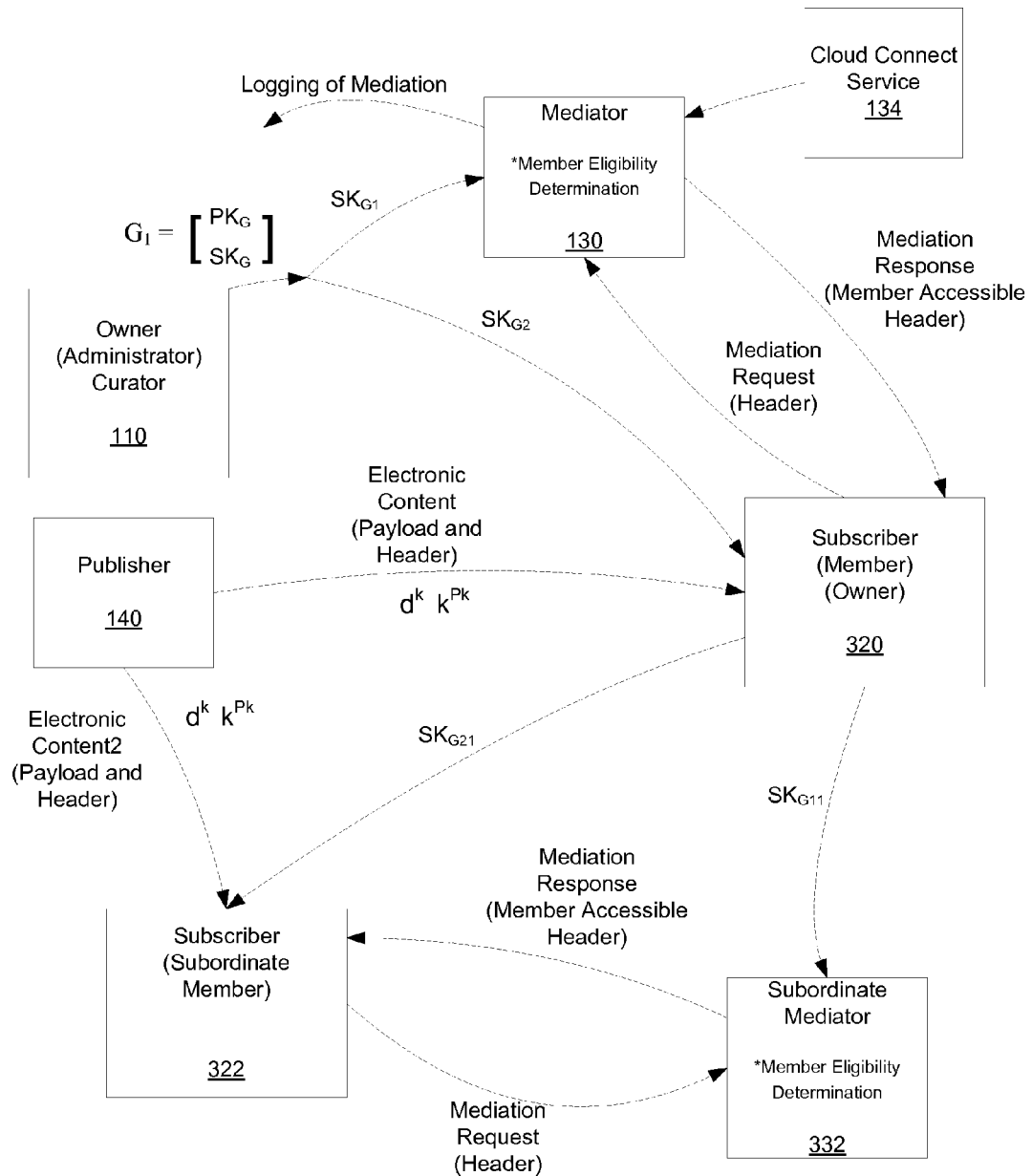
FIG. 3 shows another system that provides enforcement of policies to a resource utilizing an electronic content, according to an embodiment.

FIG. 3 shows another system that provides enforcement of policies to a resource utilizing an electronic content, according to an embodiment. FIG. 3 shows that for an embodiment, the member 320 can also play the role of an owner, and create a subordinate group that includes a subordinate member 322. As previously described, each of the parties of the system can be multiple roles.

Similar to the group formation previously described, the owner 320 (also playing the role of member as previously described) publishes a group public key $PK_{G2}$, and generating and maintaining a group secret key $SK_{G2}$ as a secret. The owner can store the group secret key $SK_{G2}$, for example, in its own data center.

The subordinate member 322 and a subordinate mediator 332 each publish their own public keys, and maintain corresponding secret keys as a secret. The subordinate member 322 and the subordinate mediator 332 can each secure their secret key by protecting the secret key through encryption before storing or transmitting the secret key to a custodian. That key encryption key can be derived from a pass phrase that only the principal (originator of the secret key) knows.

Once the group has been formed, the owner 320 adds members (such as sub-ordinate member 322) by generating a first share $SK_{G21}$ from the group secret key $SK_{G2}$ and a public key of the sub-ordinate member 322, and a second share $SK_{G2}$ from the group secret key $SK_{G2}$ and a public key of a subordinate mediator 332. The owner 320 adds the sub-ordinate member to the group by obtaining the sub-ordinate member's public from the sub-ordinate mediator 332 (or some other public source).

Once the group has been formed and the owner 320 has published the group public key $PK_{G21}$, the publisher 140 (note that this can be an entirely different publisher than previously described) can encrypt an electronic content using the group public key $PK_{G21}$. For an embodiment, the subordinate user 322 retrieves the group public key $PK_{G2}$ from the owner 320, wherein the owner 320 is operating in the directory role. For an embodiment, the electronic content is encrypted according to a key K, and the key K is encrypted according to the group public key $P_{KG21}$. For an embodiment, the electronic content includes a payload and a header.

The subordinate member 322 can obtain the encrypted electronic content in various ways. The publisher 140 may send the encrypted electronic content to the subordinate member 322, the subordinate member 322 may retrieve the encrypted electronic content, or there may be an intermediary, such as, drop box between the publisher 140 and the subordinate member 322.

The subordinate sub-ordinate member 322 receives the electronic content, but cannot directly decrypt the electronic content because the sub-ordinate member 322 does not have access to the group secret key $SK_{G21}$. However, at least some embodiments allow the sub-ordinate member 322 to decrypt the electronic content through the aid of the sub-ordinate mediator 332. More specifically, for an embodiment, the sub-ordinate member 322 request mediation by the sub-ordinate mediator 332 by submitting the header of the electronic content to the sub-ordinate mediator 332. If the electronic content is small, the header may actually be the payload of the electronic content. More typically, the payload is large, and the header only includes a cryptographic secret that can be used to unlock the payload.

Once the sub-ordinate mediator 332 receives the request for mediation from the sub-ordinate member 322, the sub-ordinate mediator 332 checks to confirm that the sub-ordinate member 322 is eligible for decryption of the electronic content. The eligibility of the sub-ordinate member 322 can be determined in one more ways.

For an embodiment, the sub-ordinate mediator 332 logs the requests by the member, eligibility determinations, and mediator responses. For an embodiment, the logging includes the sub-ordinate mediator 332 storing the requests by the member, eligibility determinations, and mediator responses. Each of these can be logged at a server, wherein the server is accessible by the owner and others. For an embodiment, the logging includes the mediator dispatching alerts of the requests by the member, eligibility determinations, and mediator responses to the owner and others.

If the sub-ordinate mediator 332 determines that the sub-ordinate member 322 is eligible, the sub-ordinate mediator 332 responds to the request for mediation with a member accessible header, wherein the member accessible header includes the header after application of $SK_{G21}$.

For an embodiment, the sub-ordinate member 322 obtains a secret based on $SK_{G11}$ and the member accessible header. Further, the sub-ordinate member 322 decrypts the payload of the electronic content using the secret. Through the controlled electronic content access of the described embodiments, the sub-ordinate member 322 is able to decrypt the electronic content only through the participation and control of the mediator, and the owner 320.

Figure 4:
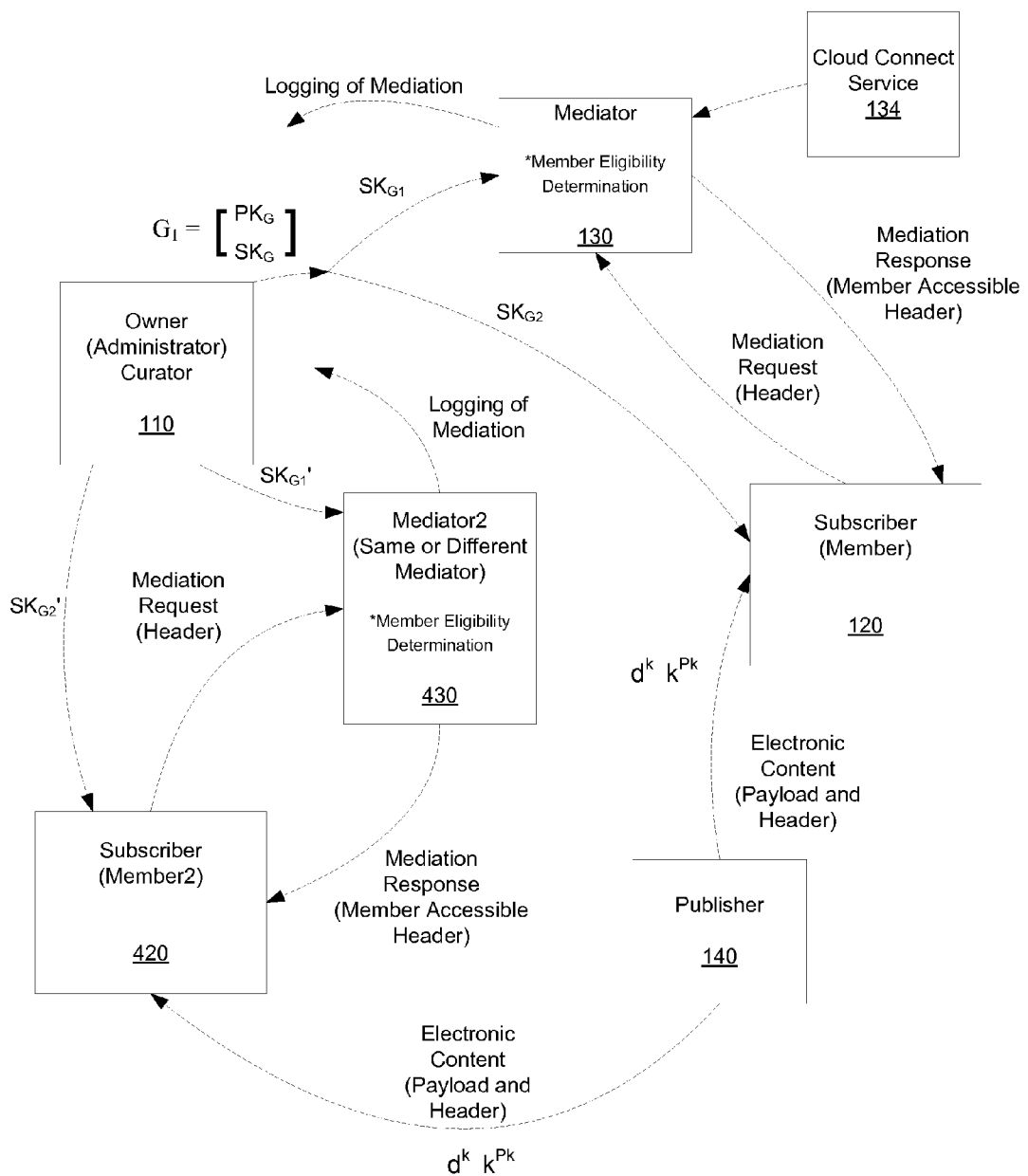
FIG. 4 shows another system that provides enforcement of policies to a resource utilizing an electronic content, according to an embodiment.

FIG. 4 shows another system that provides for monitoring and control of access to an electronic content, according to an embodiment. This embodiment includes the addition of a second member 420. Similar to the embodiments previously described, the owner 110 can add the second member 420 by generating a first share $SK_{G1}'$ from the group secret key $SK_G$ and a public key of the second member, and a second share $SK_{G2}'$ from the group secret key $SK_G$ and the public key of the mediator (here, a second mediator 430 is shown, but the mediator can alternatively be the prior mediator 130). Further, the owner 110 provides the first share $SK_{G1}'$ to the second member 420 and the second share $SK_{G2}'$ to the mediator 430, wherein the second share $SK_{G2}$ is different than the second share $SK_{G2}'$.

For at least some embodiments, there are multiple mediators for either business reasons, such as separation of responsibilities, or for compliance reasons where certain categories of mediation are performed by a compliant entity, or for federal or government reasons where some of the mediation is deemed to be more sensitive. In addition to partitioning of mediators in this manner, it might be desired to have a level of redundancy and scale by duplicating the functionality of a mediator across multiple instances.

Figure 5:
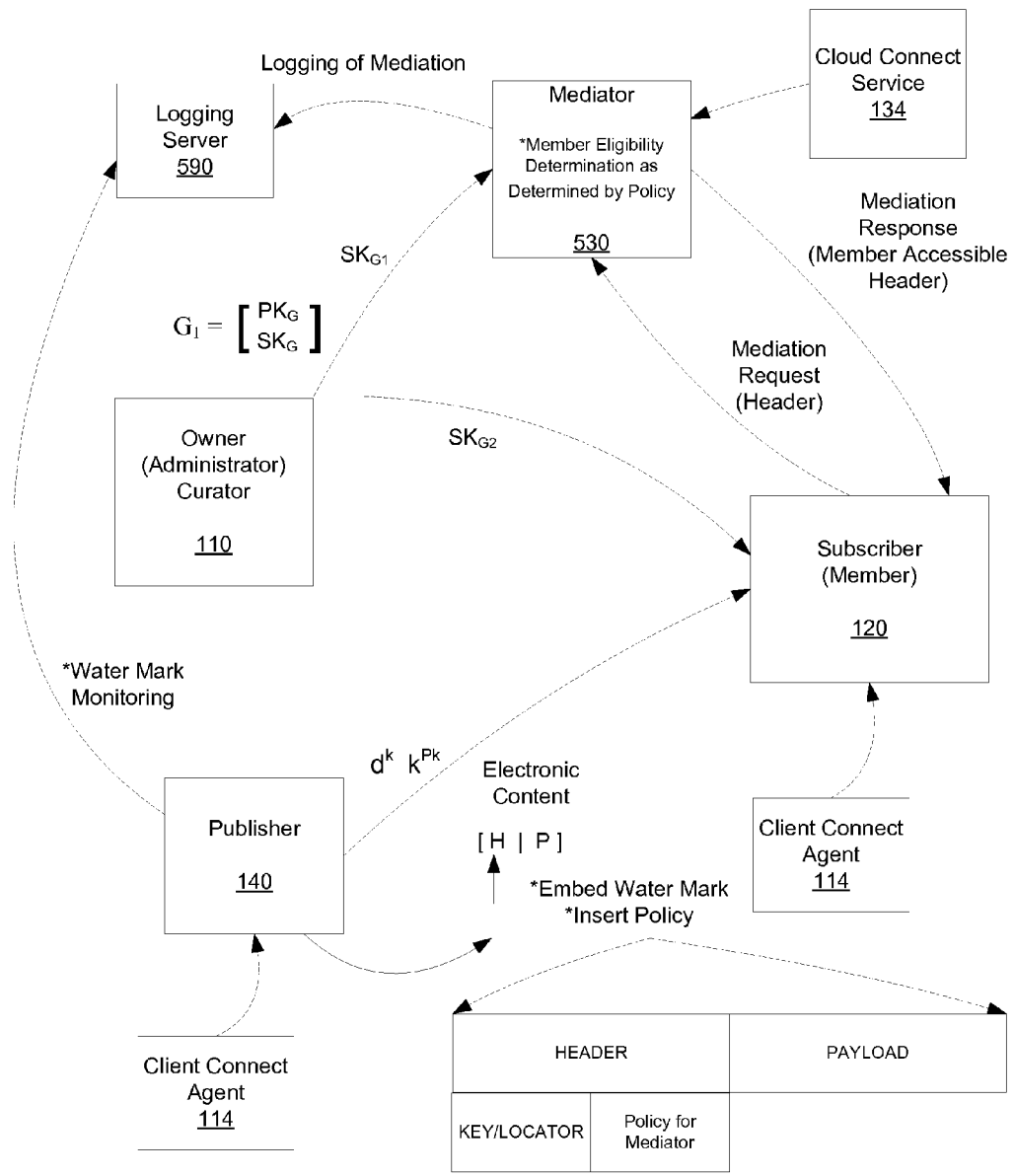
FIG. 5 shows another system that provides enforcement of policies to a resource utilizing an electronic content, according to an embodiment.

FIG. 5 shows another system that provides enforcement of policies to a resource utilizing an electronic content, according to an embodiment. This embodiment includes water mark and policy controls of the publisher. As previously described, the publisher 140 provides an electronic content to the member 120 that includes a header a payload. As previously described, for an embodiment, if the electronic content is small, the header may actually be the payload of the electronic content. For another embodiment, the payload is large, and the header only includes a cryptographic secret that can be used to unlock the payload. For an embodiment, the payload includes a pointer to where the electronic content is located (stored). Again, the header may include a cryptographic secret that can be used to unlock the payload (pointer).

The publish 140 can maintain some control by embedding, for example, an opaque watermark in the header, and logging (at, for example, a logging server 590), by a mediator 530, the header when received by the mediator 530 from the member, 120 thereby allowing the publisher 140 to track the electronic content. For at least some embodiments, the watermark is selectively translucent to other parties, perhaps log processing services, that might be able to detect patterns and anomalies, but in a manner that minimizes compromise of sensitive content. As shown in FIG. 4, the header may include a key/locator that is necessary for the intended recipient to obtain access to the sensitive payload. For at least some embodiments, the received electronic content is a composite of a header and a payload, and the secret is the decryption key that is made available subsequent to mediation. In addition, for at least some embodiments, the secret might be augmented with a verification key for ensuring that the payload has not been tampered with in transit or storage. In cases where this payload is absent, perhaps for reasons of efficiency or enhanced security, the secret might also consist of a locator, such as a Uniform Resource Identifier, along with a decryption key. The intended recipient only knows of the real location of the payload that is a candidate for decryption after a successful mediation.

Another embodiment includes the publisher 140 inserting, an electronic content specific policy in the header (as shown in FIG. 5 as a policy for mediator 530), wherein only the mediator 530 can decrypt the policy, and wherein the electronic content specific policy provides additional instructions regarding eligibility of the member. For an embodiment, the policy directs the mediator to request mediation from a higher mediator authority. In at least some embodiments, the policy is not visible to the members, but is made available to the mediator 530. In other embodiments, the policy that is visible to the mediator 530 consists of subsequent instructions, such as the need to consult with a policy decision point, where those instructions to that policy decision point may not necessarily be visible to the mediator 530.

For an embodiment, the header optionally contains visible information for intermediaries to perform cryptographic operations that might include checking for integrity of the encrypted payload, or establishing non-repudiation or data provenance. For an embodiment, the member accessible header optionally contains information for performing cryptographic operations that might include checking for integrity of the encrypted or decrypted payload, or establishing non-repudiation or data provenance.

Figure 6:
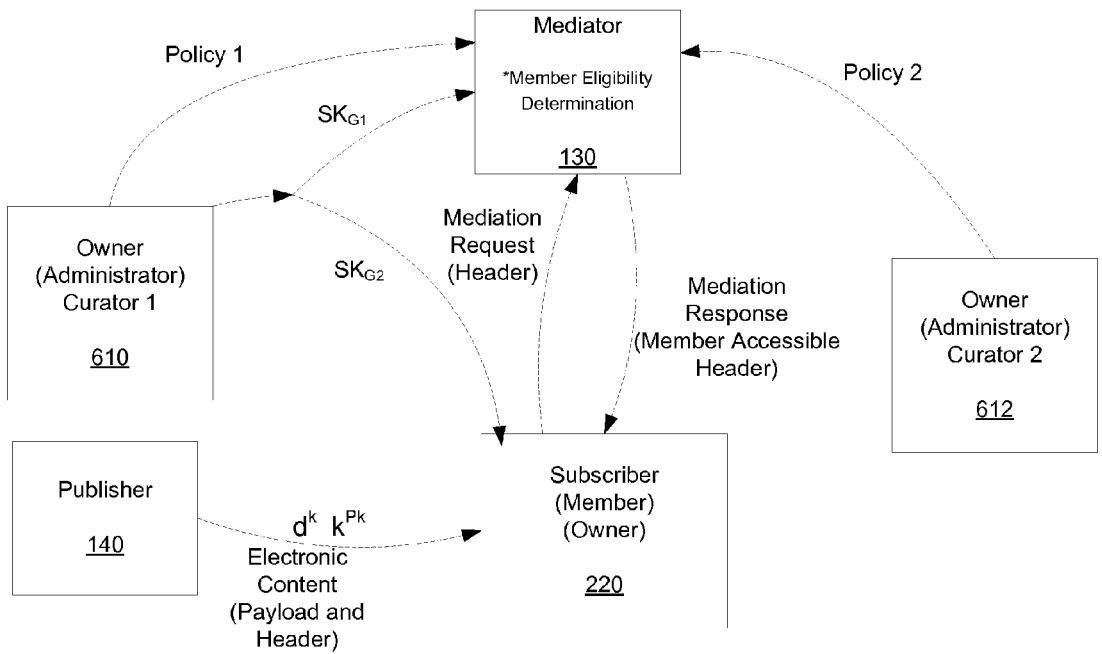
FIG. 6 shows another system that provides enforcement of policies to a resource utilizing an electronic content, according to an embodiment.

FIG. 6 shows another system that provides enforcement of policies to a resource utilizing an electronic content, according to an embodiment. This embodiment includes a first owner 610 and a second owner 612. As shown, the first owner 610 provides a first policy and the second owner 612 provides a second policy. This embodiment provides for extension to multiple owners (curators) and provides federation of the curators, wherein each owner (curator) is responsible for their own sets of content. While two owners are shown, the described embodiments are not limited to two owners.

Typically in a scenario that involves collaboration or commerce, there are diverse, perhaps mutually distrustful participants that need to manage their own access policies that might include management of white or black lists, and perhaps ratings of buyers, sellers or other participants. These scenarios are "federated" and can consist of more than one owners might either have exclusive control over their respective sets of electronic contents that they are the resource providers of, or it may be the case that they may have to co-operate through some policy to be able to update or modify the mediation policy.

Figure 7:
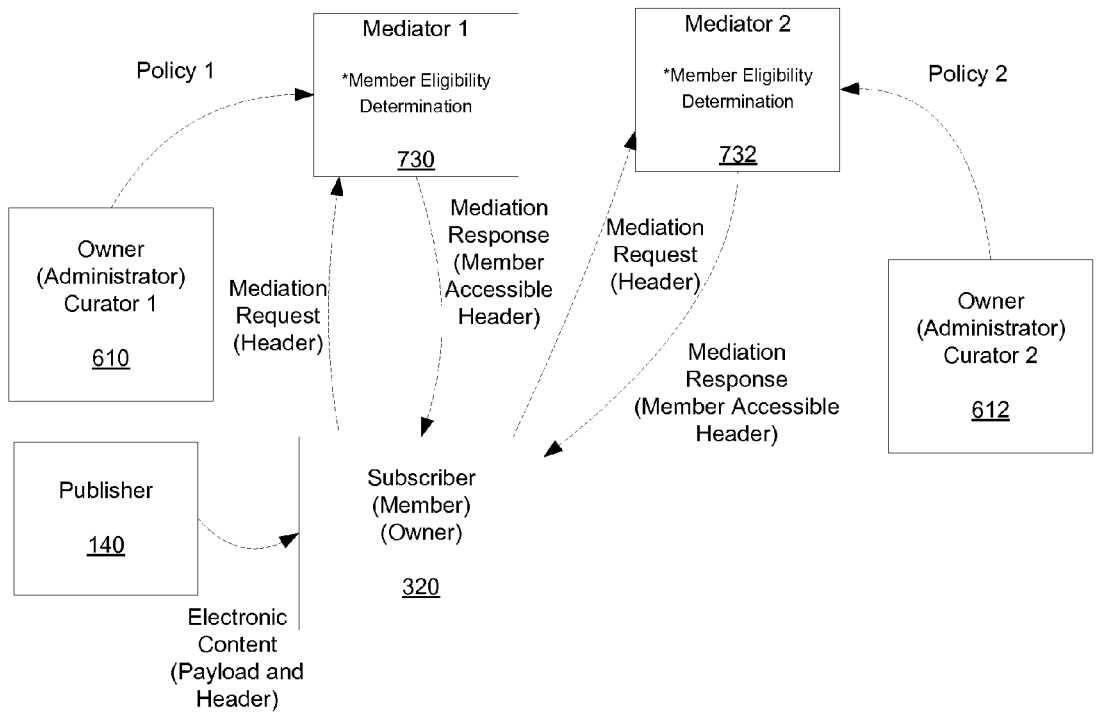
FIG. 7 shows another system that provides enforcement of policies to a resource utilizing an electronic content, according to an embodiment.

FIG. 7 shows another system that provides for monitoring and control of access to an electronic content, according to an embodiment. This embodiment includes a first mediator 730 and a second mediator 732. For mediation, each of the mediators 730, 732 weigh in. While two mediators are shown, the described embodiments are not limited to two mediators.

The described embodiments enable the high-scale enablement of existing networks such as International Trade, where multiple mediators, as described below, might represent the banks that represent buyers and sellers, and the eligibility for access to electronic goods, or to the payment, is gated by the need for a successful mediation by the appropriate mediator, which is likely to have up-to-date information about the transaction in question.

There are other federation scenarios where the participants may not be willing or able to agree upon a single mediator. This might be for global commerce, where the physical location of a mediator might make it subject to disruption or coercion by local powers. In such a situation, at least some embodiment include more than one mediator that is isolated within distinct physical or electronic boundaries that limits physical or electronic access, and the successful mediation requires all mediators to execute a mediation operation. It is possible to have more expressive circuits, such as thresholds, where perhaps a specified majority of mediators needs to execute their part in the mediation, before the intended recipient gets access to the payload.

FIG. 8 is a flow chart that includes steps of a method of a mediator enforcing policies to a resource utilizing an electronic content, according to an embodiment. A first step 810 includes creating, by an owner server, a group comprising generating a group public key $PK_G$ and a group secret key $SK_G$, and the owner defining policies associated with the group. A second step 820 includes adding, by the owner server, a member to the group, comprising generating a first share $SK_{G1}$ from the group secret key $SK_G$ and a public key of a member, and a second share $SK_{G2}$ from the group secret key $SK_G$ and a public key of a mediator. A third step 830 includes providing, by the owner server, the first share $SK_{G1}$ to a member server of the member and the second shares $SK_{G2}$ to a mediator server of the mediator.

FIG. 9 is a flow chart that includes additional steps of a method for monitoring and control of access to an electronic content, according to an embodiment. A first step 940 includes a user publishing an electronic content for the group, comprising the user encrypting the electronic content to the group public key $PK_G$, wherein the electronic content includes a header and a payload. A second step 950 includes obtaining, by the member, the encrypted electronic content. A third step 960 includes requesting, by the member, mediation by the mediator, comprising the member dispatching the header of the encrypted electronic content to the mediator. A fourth step 970 includes determining, by the mediator, whether the member is eligible to access the electronic content based at least in part on the policies associated with the group, if eligible, the mediator responding to the request for mediation with a member accessible header, wherein the member accessible header includes the header after application of $SK_{G2}$. A fifth step 990 includes obtaining, by the member, a secret based on $SK_{G1}$ and the member accessible header. A sixth step 990 includes decrypting, by the member, the payload of the electronic content using the secret.

As described, for an embodiment, the electronic content provides access to the resource. For an embodiment, the resource includes a physical resource, ant the electronic content provides access to use of the physical resource. For an embodiment, the resource includes at least one financial instrument, and the electronic content provides access to the financial instrument.

For an embodiment, the policies associated with the group control access to the resource. For an embodiment, the policies associated with the group control access to the group. For an embodiment, the policies associated with the group control access to add resources to the group. For an embodiment, the policies associated with the group control access to administer the group.

For an embodiment, the electronic content is stored at a custodian.

For an embodiment, the mediator determines which policy applies to the resource through the header.

For an embodiment, the mediator determines which policy applies to the resource by accessing policy information. For an embodiment, the policy is based at least in part on the policies associated with the group. For an embodiment, the policy is accessed from a policy server. For an embodiment, the mediator determines which policy applies to the resource through the header, and by accessing policy information.

For an embodiment, the determining, by the mediator, whether the member is eligible to access the resource is additionally based at least in part on member state information. For an embodiment, the member state information includes assigned location information. For an embodiment, the assigned location information is received from a radio receiver of the user. For an embodiment, the member state information includes attestations of eligibility to access properties of the resource.

For an embodiment, the member determines whether the member has access to the resource or properties of the resource based on the member state information. For an embodiment, the member server runs a trusted agent, and wherein the trusted agent verifies that the member has access to the resource or properties of the resource based on the member state information.

For an embodiment, resource policies are set or applied by any user. For an embodiment, the determining, by the mediator, whether the member is eligible to access the resource is additionally based at least in part on the resource policies.

For an embodiment, user policies are set or applied by any user. For an embodiment, the determining, by the mediator, whether the member is eligible to access the resource is additionally based at least in part on the user policies.

Figure 10:
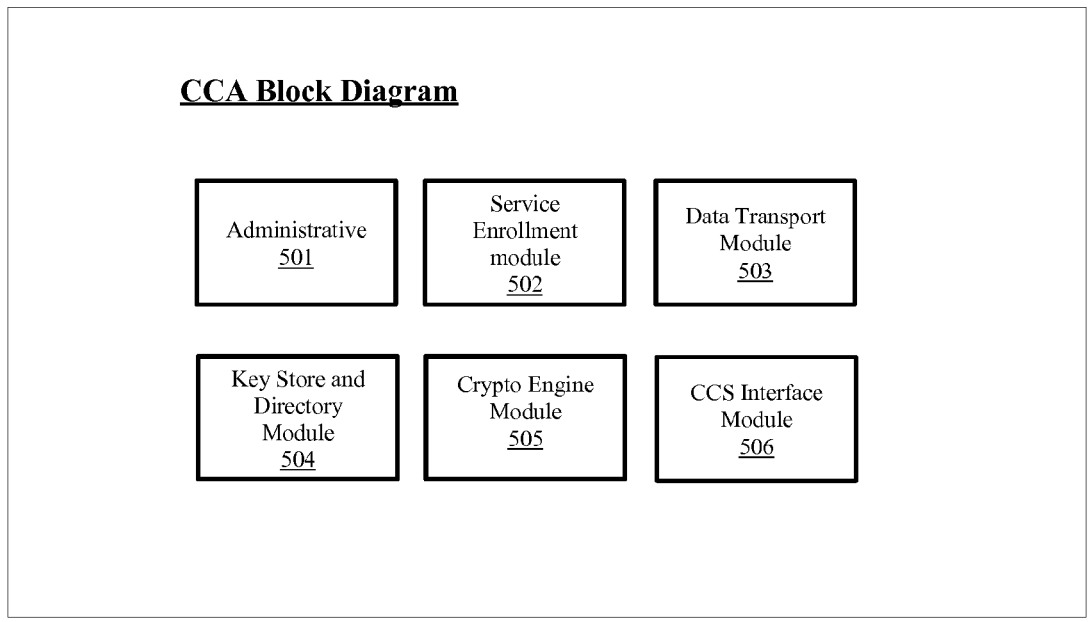
FIG. 10 shows a client connect agent according to an embodiment.

FIG. 10 shows an embodiment of the client connect agent (CCA) according to an embodiment. As previously described and shown in FIGS. 1, 2, 3 and 4, the member 120 and the publisher 140 have access to the client connect agent (CCA) 114. As described, an embodiment of CCA can be an independent software application program running in the member 120 or the publisher's 140 computing device, such as desktop, laptop, mobile device, etc. Another embodiment of CCA is operable to run within a web browser.

As shown, this embodiment includes at least the following modules an Administrative Module 501, a Service Enrollment Module 502, a Data Transport Module 503, a Key Store and Directory Module 504, a Crypto Engine Module 505, and a CCS Interface Module 506.

For an embodiment, the Administrative Module 501 performs various configuration and administrative tasks to configure the local CCA, to manage users and groups within the CCA control, to interface with human users through a command line interface (CLI) or a UI interface (UI), to interface with other programs through an application programming interface (API), to update CCA software from the connected CCS, and to send event logs to CCS via CCS Interface Module 506.

For an embodiment, the Service Enrollment Module 502 performs enrollment tasks with a realm that is represented by one or more curators. The Service Enrollment Module 502 also manages the password and the login process with the connected CCS, among others.

For an embodiment, the Data Transport Module 503 is responsible for data upload and download. The data can be uploaded from the compute device where the CCA operates and to any data repository in the cloud through any data transfer protocol such as email, HTTP, FTP, etc. or physical data storage media such as floppy disc, CD ROM, DVD ROM, USB Drive, etc., and vice versa.

For an embodiment, the Key Store and Directory Module 504 stores local user's secrets (such as the private/secret keys,) that are encrypted and copies of various certificates that can be used for local CCA cache access and offline operations.

For an embodiment, the Crypto Engine Module 505 performs various encryption/decryption, signing, and key generation functions.

For an embodiment, the CCS Interface Module 506 performs secure communications with CCS. For at least some embodiments, the CCS Interface Module 506 includes a RESTful interface Adapter—CRUD calls for data and control communications between SCA and CCS, a WebSockets—Receive Callbacks from CCS, and a DNS Resolver—fast path for querying the CCS for directory (certificates) lookup and requesting for Mediation operations.

Figure 11:
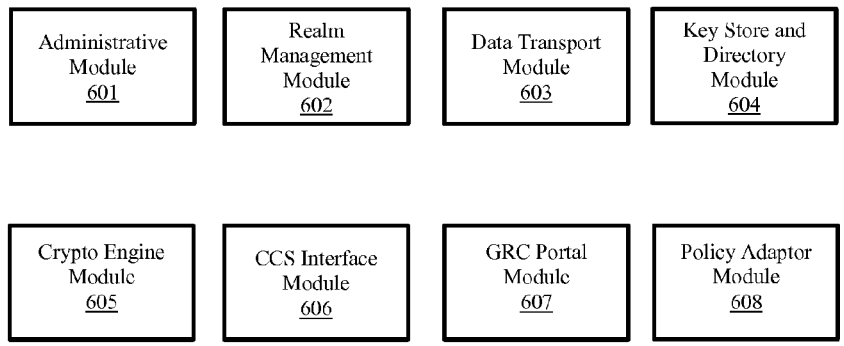
FIG. 11 shows a service connect agent according to an embodiment.

As shown, the owner 110 as shown in FIGS. 1, 2, 3 and 4 is at least partially controlled by a server connect agent (SCA) 142. For an embodiment, the SCA 142 includes a software appliance that can be packaged as, but not limited by, a piece of executable program in a binary form, a virtual machine, or a dedicated server. For at least some embodiments, the software appliance runs within a curator's firewall. Depicted in FIG. 11, the embodiments of the SCA 142 includes an Administrative Module 601, a Realm Management Module 602, a Data Transport Module 603, a Key Store and Directory Module 604, a Crypto Engine Module 605, a CCS Interface Module 606, a GRC Portal Module 607, an a Policy Adaptor Module 608.

For at least some embodiments, the Administrative Module 601 performs various configuration and administrative tasks to configure the local SCA, to manage users and groups within the SCA control, to interface with human users through a command line interface (CLI) or a UI interface (UI), to interface with other programs through an application programming interface (API), to update SCA software from the connected CCS, and to send event logs to CCS via CCS Interface Module 506.

For at least some embodiments, the Realm Management Module 602 is responsible for creating and managing a realm. The Realm Management Module 602 performs tasks to invite or permit parties that are partially controlled by CCAs to join the realm. It is also capable of revoking a realm membership. For an embodiment, a realm is one or more curators that are controlled by one SCA. Parties participating in the trustworthy workflow must be enrolled in at least one realm.

For at least some embodiments, the Data Transport Module 603 is responsible for data upload and download. The data can be uploaded from any data source within the one or more curators controlled by the SCA and to any data repository in the cloud through any data transfer protocol such as email, HTTP, FTP, etc. or physical data storage media such as floppy disc, CD ROM, DVD ROM, USB Drive, etc., and vice versa. One source of data can be content containers controlled by Microsoft© SharePoint software.

For at least some embodiments, the Key Store and Directory Module 604 stores the realm user's secrets (such as their private/secret keys,) that are encrypted and copies of various certificates that can be used for the SCA cache access and offline operations.

For at least some embodiments, the Crypto Engine Module 605 performs various encryption/decryption, signing, and key generation functions.

For at least some embodiments, the CCS Interface Module 606 performs secure communications with CCS. At least some embodiments of the CCS Interface Module 606 include a RESTful interface Adapter—CRUD calls for data and control communications between the SCA and CCS, a WebSockets—Receive Callbacks from CCS, and a DNS Resolver—fast path for querying the CCS for directory (certificates) lookup and requesting for Mediation operations.

For at least some embodiments, the GRC Portal Module 607 is responsible for configuring logs, alerts and reports for the realm, querying, and receiving from, CCS for logs, alerts and reports, searching and indexing logs, and caching logs locally, and presenting the log information.

For at least some embodiments, the Policy Adaptor Module 608 provides integration interfaces with the existing data and identity management infrastructures in the one or more curators controlled by the SCA. For at least some embodiments, the interfaces include support for protocols and services such as, an Active Directory (AD), an Active Directory Federation Services (ADFS), a Certificate Authority (CA), a Security Assertion Markup Language (SAML), an Online Certificate Status Protocol (OCSP), and/or Proxy Services.

As shown in FIGS. 1, 2, 3 and 4, the mediator 130 at least partially controlled by a cloud connect service (CCS) 134. For at least some embodiments, the CCS 134 is a collection of software running as Software as a Service (SaaS) in the cloud, hosted by one or multiple Infrastructure as a Service (IaaS) providers. It is a high-scale, always-on, possibly geo-distributed policy enforcement point, which can facilitate complex, possibly cross-continental collaboration and commerce. The CCS 134 is termed "Trustworthy", meaning that it cannot access any data or policy in the clear or cheat because it is prevented from doing so by cryptography based technologies. Without such a capability it would be technologically complex to monitor and enforce CCS 134 behavior, if at all that were to be possible.

Figure 12:
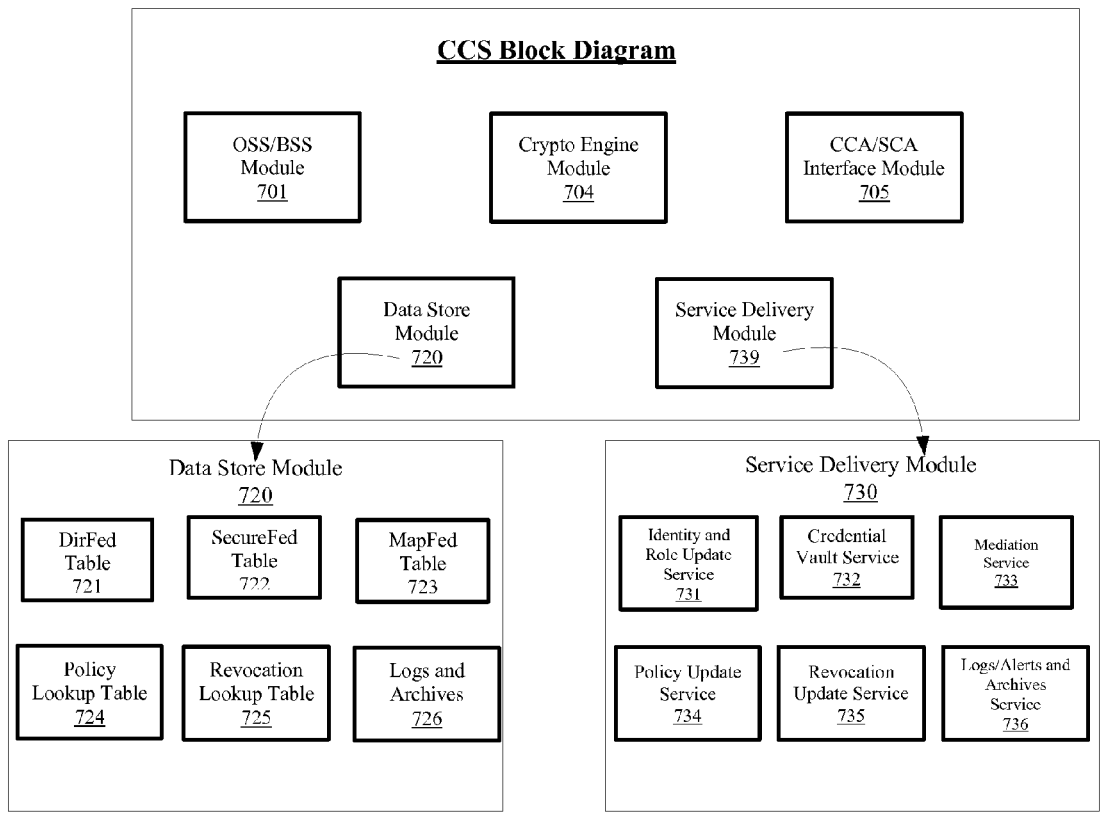
FIG. 12 shows a cloud connect service according to an embodiment.

As illustrated in FIG. 12, at least some embodiments of the CCS 134 include an OSS/BSS Module 701, a Data Store Module 720, a Service Delivery Module 739, a Crypto Engine Module 704, and a CCS/SCA Interface Module 705.

For at least some embodiments, the OSS/BSS Module 701 performs operations including provisioning, metering, billing, syndication, federations, and other external service interfaces. An embodiment of the OSS/BSS Module 701 provides customer support and trouble shooting.

For at least some embodiments, the Data Store Module 720 at least partially includes one or more of a DirFed Table 721, SecureFed Table 722, a MapFed Table 723, a Policy Lookup Table 724, a Revocation Lookup Table 725, and a Logs and Archives 726. For an embodiment, the DirFed Table 721 is a directory for user and group identities, certificates, policies and other artifacts, which are typically represented by the corresponding entity's public keys. For at least some embodiments, the SecureFed Table 722 stores encrypted secrets. For an embodiment, the CCS, nor any custodian, is able to decrypt any entry in this table. For at least some embodiments, the MapFed Table 723 stores, among others, Group membership records, represented, at least partially, through signed Mediation Keys, and Realm roles including attestations and signatures from the realm SCAs. For an embodiment, the Policy Lookup Table 724 provides rapid lookup for multi-hop re-encryption key chains. For an embodiment, the Revocation Lookup Table 725 provides rapid lookup for revocation lists. For an embodiment, the Logs and Archives 726 keeps activities logs and events. It also archives for policies and activities, as well as data.

For at least some embodiments, for each sub-module 721-726, the Service Delivery Module 739 includes at least a corresponding services delivered to CCAs and SCAs. For an embodiment, services 731-736 of the Service Delivery Module 739 may interact with multiple sub modules 721-726. For an embodiment, an Identity and Role Update Service 731 receives identity and role update requests from SCAs and CCAs and updates the corresponding DirFed 721 entries. For an embodiment, a Credential Vault Service 732 uploads and downloads the encrypted data, encrypted keys and encrypted policies upon requests from CCAs and SCAs, and updates entries in SecureFed 722 and Logs and Archives 726. For an embodiment, a Mediation Service 733 receives Mediation Keys and Mediation operation requests from SCAs and CCAs, and performs the requested operations. It updates and reads entries in MapFed 723. It may also interact with Policy Lookup Table 724 and Revocation Lookup Table 725 to validate identities and authorizations. For an embodiment, a Policy Update Service 734 updates groups and group memberships in DirFed 721, upon requests from SCAs, among other tasks. For an embodiment, a Revocation Update Service 735 receives identity and role revocation requests from, primarily, SCAs and updates entries in MapFed 723 and Revocation Lookup Table 725. Among other sources, such requests may originate from the CA and OCSP interfaces in Policy Adaptor Module 608. For an embodiment, a Logs/Alerts and Archives Service 736 receives event logs from SCAs and CCAs and responds to SCAs (GRC Portal Module 607) requests The interaction methods between CCSs, SCAs and CCAs through above described modules and the combined system effects towards providing the trustworthy workflow across trust boundaries will become more apparent from the Operative Steps description as follows.

Although specific embodiments have been described and illustrated, the embodiments are not to be limited to the specific forms or arrangements of parts so described and illustrated.

What is claimed:

1. A method of a mediator enforcing policies to a resource utilizing an electronic content, comprising:

receiving, by a mediator computing device of a mediator, a second share $SK_{G2}$ from an owner server, wherein a first share $SK_{G1}$ is provided to a member server of a member of a group by the owner server;

wherein the group is created by the owner server generating a group public key $PK_G$ and a group secret key $SK_G$, and wherein the owner defines policies associated with the group;

wherein the member is added by the owner server to the group by generating the first share $SK_{G1}$ from the group secret key $SK_G$ and a public key of the member, and the second share $SK_{G2}$ from the group secret key $SK_G$ and a public key of the mediator;

wherein a user publishes an electronic content for the group, comprising the user encrypting the electronic content to the group public key $PK_G$, wherein the electronic content includes a header and a payload; and wherein the member obtains the encrypted electronic content;

further comprising;

the mediator receiving a request from the member for mediation, comprising the mediator receiving a dispatch of the header of the encrypted electronic content;

determining, by the mediator, whether the member is eligible to access the electronic content based at least in part on the policies associated with the group, if eligible, the mediator responding to the request for mediation with a member accessible header, wherein the member accessible header includes the header after application of $SK_{G2}$;

wherein the member obtains a secret based on $SK_{G1}$ and the member accessible header; and wherein the member decrypts the payload of the electronic content using the secret.

2. The method of claim 1, wherein the electronic content provides access to the resource.

3. The method of claim 1, wherein the electronic content provides access to use of a physical resource.

4. The method of claim 1, wherein the resource includes at least one financial instrument, and the electronic content provides access to the financial instrument.

5. The method of claim 1, wherein the policies associated with the group control access to the resource.

6. The method of claim 1, wherein the policies associated with the group control access to the group.

7. The method of claim 6, wherein the policies associated with the group control access to add resources to the group.

8. The method of claim 1, wherein the policies associated with the group control access to administer the group.

9. The method of claim 1, wherein the electronic content is stored at a custodian.

10. The method of claim 1, wherein the mediator determines which policy applies to the resource through the header.

11. The method of claim 1, wherein the mediator determines which policy applies to the resource by accessing policy information.

12. The method of claim 1, wherein the mediator determines which policy applies to the resource through the header, and by accessing policy information.

13. The method of claim 1, wherein the determining, by the mediator, whether the member is eligible to access the resource is additionally based at least in part on member state information.

14. The method of claim 13, wherein the member state information includes assigned location information.

15. The method of claim 14, wherein the assigned location information is received from a radio receiver of the user.

16. The method of claim 13, wherein the member state information includes attestations of eligibility to access properties of the resource.

17. The method of claim 13, wherein the member determines whether the member has access to the resource or properties of the resource based on the member state information.

18. The method of claim 17, wherein the member server runs a trusted agent, and wherein the trusted agent verifies that the member has access to the resource or properties of the resource based on the member state information.

19. The method of claim 1, wherein resource policies are set or applied by any user.

20. The method of claim 19, wherein the determining, by the mediator, whether the member is eligible to access the resource is additionally based at least in part on the resource policies.

21. The method of claim 1, wherein user policies are set or applied by any user.

22. The method of claim 21, wherein the determining, by the mediator, whether the member is eligible to access the resource is additionally based at least in part on the user policies.

23. A mediator server operative to enforcing policies to a resource using an electronic content, comprising a mediator of the mediator server operative to:

receive a second shares $SK_{G2}$ from an owner server, wherein a first share $SK_{G1}$ is provided to a member server of a member by the owner server;

wherein a group is created by the owner server comprising generating a group public key $PK_G$ and a group secret key $SK_G$;

wherein the member is added by the owner server to the group by generating the first share $SK_{G1}$ from the group secret key $SK_G$ and a public key of the member, and the second share $SK_{G2}$ from the group secret key $SK_G$ and a public key of the mediator;

wherein a user publishes an electronic content for the group, comprising the user encrypting the electronic content to the group public key $PK_G$, wherein the electronic content includes a header and a payload; and wherein the member obtains the encrypted electronic content;

the mediator of the mediator server further operative to:

receive a request from the member for mediation, comprising the mediator receiving a dispatch of the header of the encrypted electronic content;

receive a request, by the member, for mediation, comprising the mediator receiving a dispatch of the header of the encrypted electronic content from the member;

determine whether the member is eligible to access the electronic content based at least in part on the policies associated with the group, if eligible, the mediator responding to the request for mediation with a member accessible header, wherein the member accessible header includes the header after application of $SK_{G2}$;

wherein the member obtains a secret based on $SK_{G1}$ and the member accessible header; and wherein the member decrypts the payload of the electronic content using the secret.

24. The mediator server of claim 23, wherein the electronic content provides access to the resource.

25. The mediator server of claim 23, wherein the electronic content provides access to use of a physical resource.

26. The mediator server of claim 23, wherein the resource includes at least one financial instrument, and the electronic content provides access to the financial instrument.

27. The mediator server of claim 23, wherein the policies associated with the group control access to the resource.

28. The mediator server of claim 23, wherein the determining, by the mediator, whether the member is eligible to access the resource is additionally based at least in part on member state information.

29. The mediator server of claim 23, wherein resource policies are set or applied by any user.

30. The mediator server of claim 23, wherein user policies are set or applied by any user.

* * * * *